(12) United States Patent
Haber

(10) Patent No.: US 6,872,920 B2
(45) Date of Patent: Mar. 29, 2005

(54) USER SENSING CHAFING DISH

(76) Inventor: Robert Haber, 825 E. 140th St., Bronx, NY (US) 10454

( * ) Notice: Subject to any disclaimer, the term of this patent is extended or adjusted under 35 U.S.C. 154(b) by 44 days.

(21) Appl. No.: 10/444,174

(22) Filed: May 27, 2003

(65) Prior Publication Data

US 2003/0218000 A1 Nov. 27, 2003

Related U.S. Application Data

(63) Continuation-in-part of application No. 09/900,719, filed on Jul. 9, 2001, now Pat. No. 6,593,551.

(51) Int. Cl.[7] .............................................. F27D 11/00
(52) U.S. Cl. ..................................... 219/430; 220/810
(58) Field of Search ............................... 219/430, 385, 219/386, 387, 214; 220/810–850

(56) References Cited

U.S. PATENT DOCUMENTS

| | | | | |
|---|---|---|---|---|
| 1,930,841 A | * | 10/1933 | Miniere ....................... 220/830 |
| 5,465,862 A | * | 11/1995 | Devlin ........................ 220/830 |
| 5,775,535 A | * | 7/1998 | Vercellone et al. ......... 220/318 |
| 5,788,196 A | * | 8/1998 | Forman ....................... 248/147 |
| 6,311,866 B1 | * | 11/2001 | Sambonet et al. .......... 220/830 |
| 6,460,453 B1 | * | 10/2002 | Frauenfeld ................... 99/483 |
| 6,640,798 B2 | * | 11/2003 | Anh ............................ 126/33 |
| 6,698,334 B2 | * | 3/2004 | Brown ......................... 99/339 |

* cited by examiner

Primary Examiner—Thor Campbell
(74) Attorney, Agent, or Firm—Charles E. Temko

(57) ABSTRACT

A chafing or warming dish construction typically used for buffet serving of comestibles having user sensing means which automatically opens and closes an overlying cover depending upon the presence of the user at a serving table. In a disclosed embodiment, the cover is arranged for pivotal rotation about a pair of aligned pintles. The cover is progressively counterbalanced to maintain it in any desired degree of rotation, usually ninety or one hundred eighty degrees. Also disclosed is a counter balance means which applies progressive counter balancing force as the cover is opened which force is canceled when the said cover reaches a completely opened position.

2 Claims, 10 Drawing Sheets

USER SENSING CHAFING DISH

RELATED APPLICATION

Reference is made to my application Ser. No. 09/900,719 filed Jul. 9, 2001, now U.S. Pat. No. 6,593,551 the present application being a continuation-in-part thereof.

BACKGROUND OF THE INVENTION

This invention relates generally to the field of food serving dishes or bowls typically used for buffet type serving by restaurant and similar facilities, and more particularly to an improved form of chafing device adapted to preserve the contents at a predetermined heated temperature over a substantial period of time.

It is known in the art to provide chafing dish devices having a base element adapted to be supported by a serving table along with similar devices containing other items of food. Means in the form of replaceable trays are selectively engaged upon the base element with a fresh supply of a particular food as the contents of an installed tray are removed. The base element includes a movably supported cover usually pivotally engaged along an edge thereof which is manually opened by a user to permit access to the contents of the tray, following which the cover is manually closed. In some cases, the cover is counterbalanced to remain in relatively open condition. In the case of relatively larger base elements there is provided heating means, typically using solid alcohol fuel to replace heat lost from the food during the period in which the cover is opened.

Such devices have been known in the art for many years. The principal problem from the standpoint of a user is that he or she, prior to opening the cover, is already carrying at least one plate or dish, and must perform the operation of opening the cover, transferring a desired portion of food, and closing the cover with another hand, as well as replacing a serving implement while maintaining the plate or plates in horizontal orientation. As a result, the user, particularly if elderly, often chooses or neglects to close the cover which remains in opened condition until the arrival of the next user, with undesirable heat loss in the remaining contents of the tray.

Most chafing dishes use friction mechanisms to keep the cover open during serving. Attempts have been made in the past to balance the cover with various spring mechanisms. One type used a cam, cam follower and spring to match the varying forces needed to balance the cover at different open positions. This proved uneconomical and impractical, due mostly to the maintenance requirements. Another type uses a torsion spring mounted axially on the cover shaft. When the cover is opened more than half way, the increasing spring forces become excessive, and must be overcome by friction.

In accordance with the present invention, the device uses a spring with an arm and link mechanism, which closely matches the increasing and decreasing torque required as the cover is moved from closed to half open to full open position. Because of the geometry of the mechanism, the spring balancing torque can decrease, even when the spring force is increasing. The cover can be moved effortlessly to any position, and stops in any position. The mechanism works with an extension spring on a rectangular chafing dish, or when space is a problem, such as on a round chafing dish, a torsion spring can be used.

SUMMARY OF THE INVENTION

Briefly stated, the invention contemplates the provision of an improved chafing dish construction which addresses the above-described problem. To this end, the described embodiment provides for the sensing of the presence of a user proximate to the table area supporting the chafing dish, and using this information to initialize the operation of mechanical means for opening the cover, and maintaining the same in open condition until the user has moved away from the sensed location, at which point the means serves to close the cover pending the arrival of a subsequent user or service personnel. A time delay is provided to function where the subsequent user arrives within a relatively short time increment. The cover element is of arcuate configuration and is mounted for pivotal movement about its axis, motivated by a battery powered motor which drives a side mounted cog belt which is entrained on a corresponding cog pulley on the axis of rotation of the cover. The belt carries cams which operate electrical switches controlling operation of the motor. The motor and its rechargeable batteries are preferably mounted within an insulated enclosure to dampen operational noise and are connected to the cog belt through a flexible coupling. The presence of a user is sensed by known passive infra-red sensing means located at the front or side of the device, and in a position so as not to be affected by heating means disposed beneath the replaceable tray which supports the food. Means is also provided for disconnecting the motor in the event that a user attempts to manually close the cover during a period of time delay. During normal use, the cover element will be pivoted through approximately a ninety degree or one-hundred eighty degree arc with the principal axis of rotation disposed parallel to the principal axis of the food tray.

A novel counterbalancing linkage means is employed to provide the necessary balancing torque on the cover element substantially throughout the entire path of travel.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
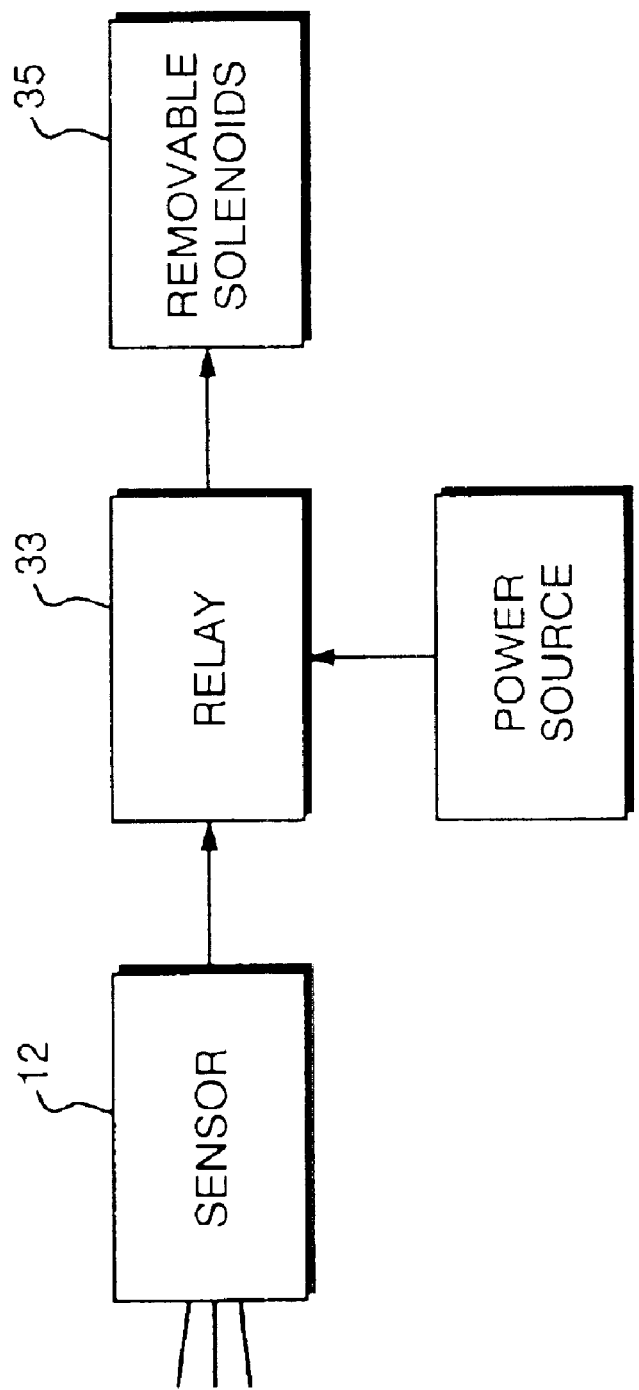
FIG. 1 is a block diagram showing the electromechanical elements comprising the disclosed embodiment of the invention.

In accordance with the invention, the device, generally indicated by reference character 10, comprises broadly, a chafing dish 11, user sensing means 12, and powered linkage means 13.

The chafing dish 11 is of generally conventional construction, including a base element 20 including a plurality of legs 21 forming a space above a supporting table for the accommodation of optional heating means 22. The body of the base element 20 includes a recess 23 accommodating a replaceable tray 24, periodically replaced as the contents of the tray are consumed. Pivoting means 25, in the form of axially disposed pintles supports a cover element 26 and a counterweight means which reduces the degree of applied force necessary to raise the cover element and maintain it in raised condition.

The sensing means 12 typically includes a known passive infrared scanning device 30 which will generate and transmit a positive signal upon detecting the presence of a user adjacent the supporting table. Scanning devices of this type are well known in the art, and are widely used as part of home intrusion detecting devices. In the present embodiment, the sensitivity of the sensor is adjusted so that the generation of a signal requires the presence of a user within approximately two feet of the chafing dish, to prevent constant operation caused by persons walking in the vicinity of the supporting table. The arcuate path of the projected infrared beam is initially adjusted so as not to sense a subsequent user positioned opposite an adjacent chafing dish until the person is opposite the device 10. A transmitted signal is received and transmitted to electrically powered relay 33 which serves to activate powered drive train means 35 described hereinafter. The relay remains closed so long as a sensor signal is received to maintain the cover in opened condition. Upon the cessation of receipt of the sensor signal, the relay unlocks and returns to a second position wherein current is directed to the drive train in an opposite direction to cause the cover to close. This type of operation presumes power from a direct current source, typically a small battery. Where the device is powered by alternating current, typically from a wall or floor outlet, the relay unit may include a direct current rectifier, also known in the art.

Where a group of devices are supported upon a table such that a shorter side is positioned at the table edge to permit the devices to be accessed from either side of the table, duplicate sensing means (not shown) may be provided at each side of the device.

Figure 3:
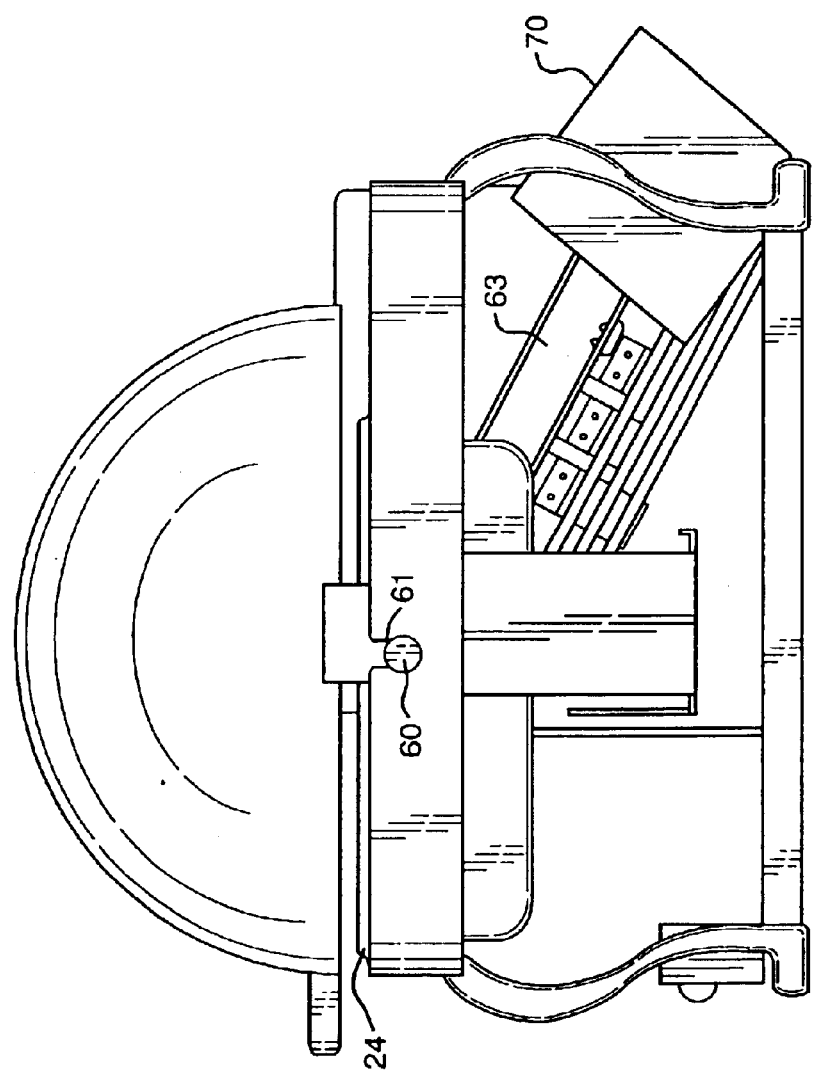
FIG. 3 is a side elevational view thereof.
Figure 4:
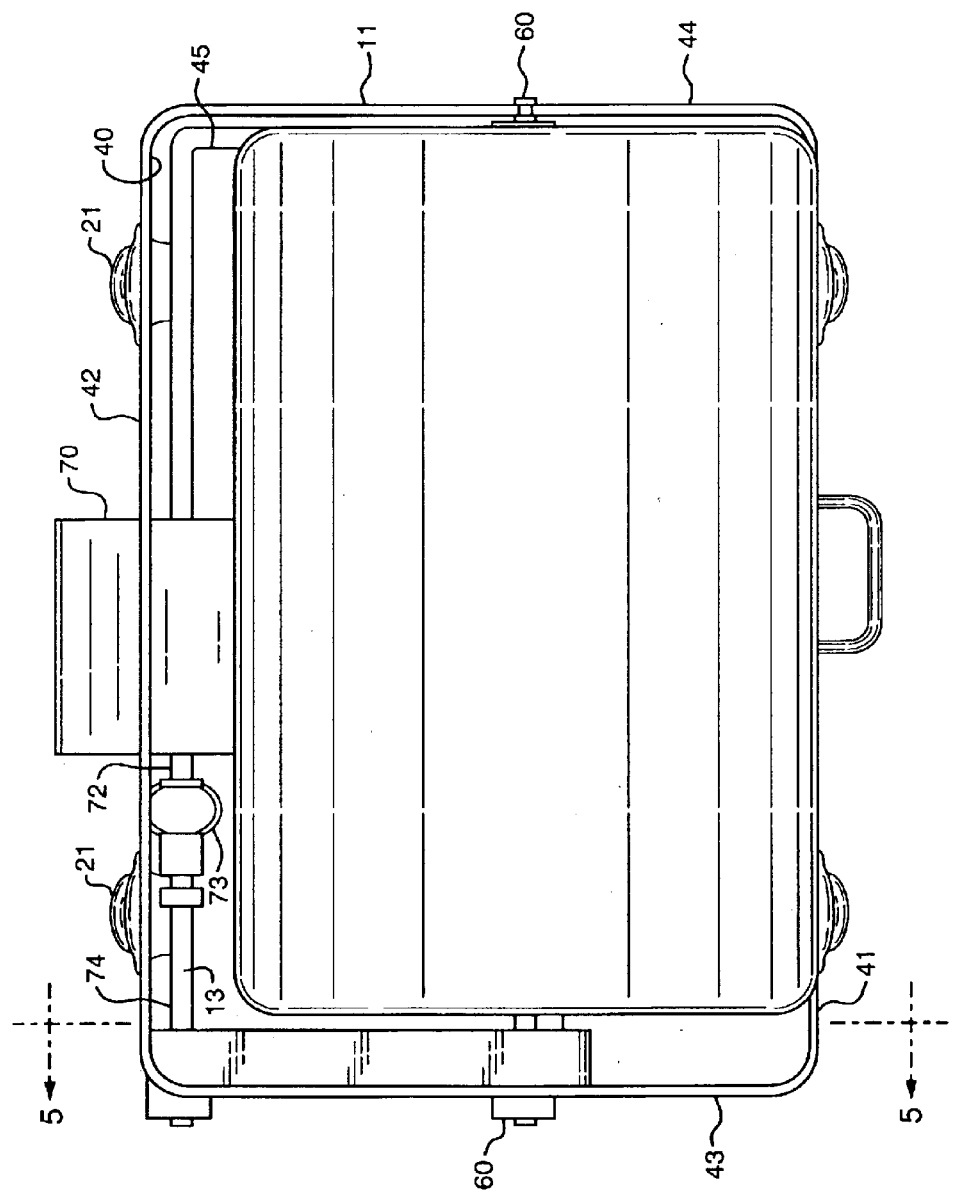
FIG. 4 is a top plan view thereof.

Referring to FIG. 4, et seq., the dish 11 includes a generally rectangular frame 40 having a front rail 41, a rear rail 42, and side rails 43 and 44 which are supported on upstanding legs 21. A continuous flange 45 supports the replaceable tray 24. (FIG. 3)

Figure 2:
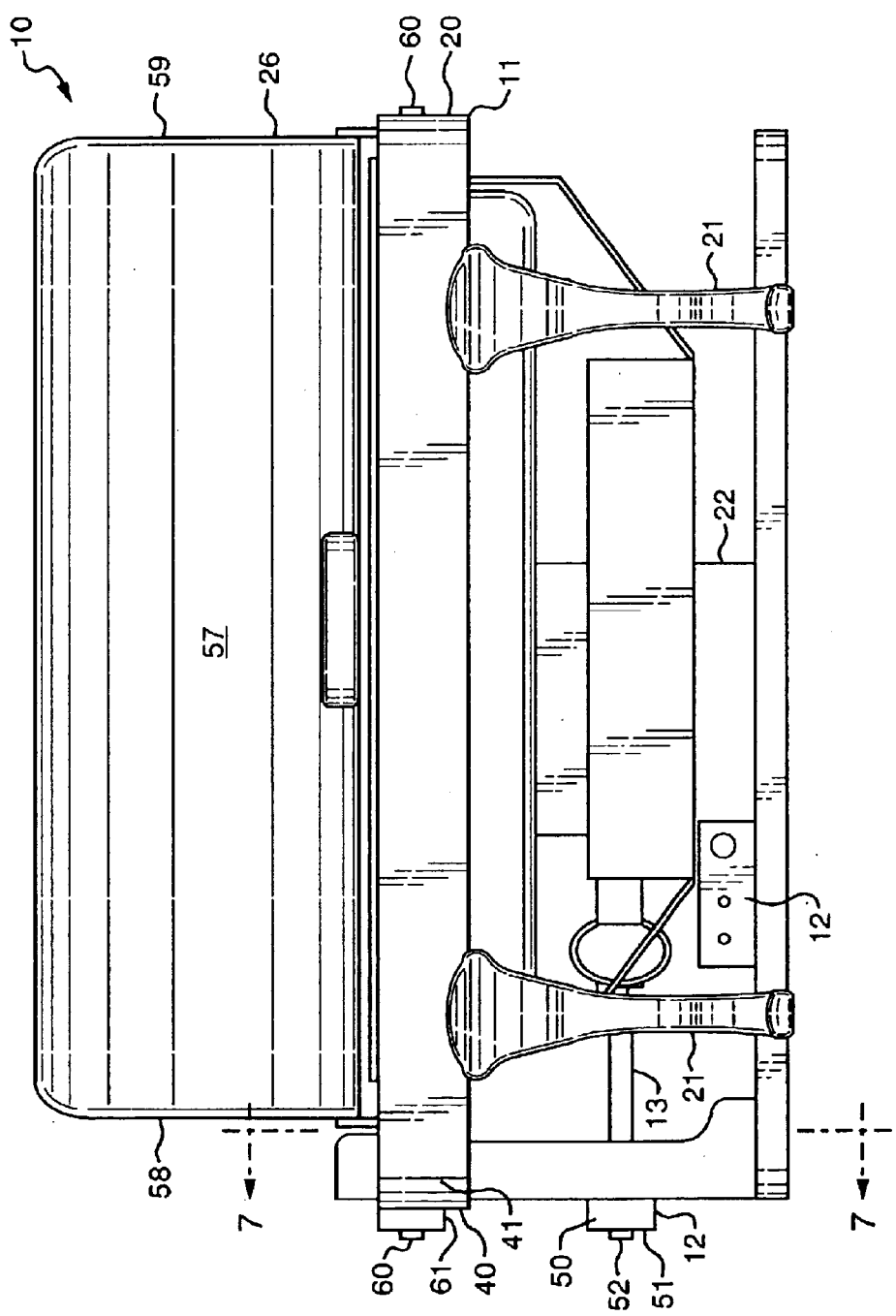
FIG. 2 is a front elevational view of an embodiment of the invention.
Figure 5:
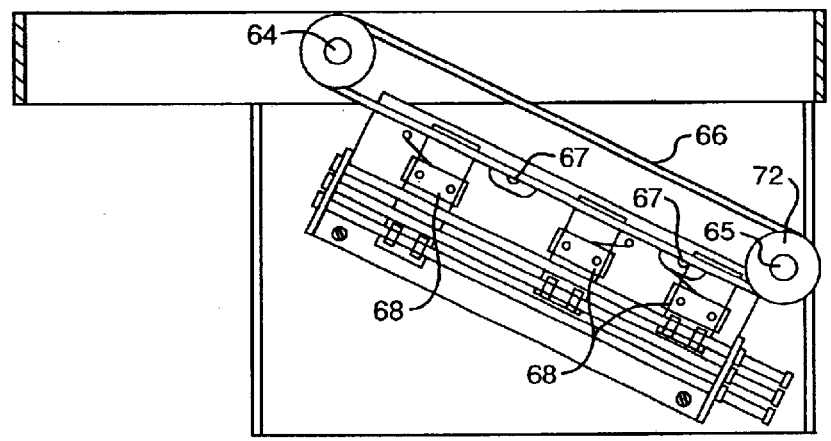
FIG. 5 is a sectional view thereof as seen from the plane 5—5 in FIG. 4.

The sensing means 12 (FIG. 2) is preferably enclosed within a generally rectangular enclosure 50, a front wall 51 of which mounts a fresnel lens 52 which transmits light to a known passive infrared circuit board (not shown) which may also mount the relay communicating with the linkage means 13. The cover element 26 is preferably of arcuate configuration, including a main wall 57 and end walls 58 and 59. A pair of pintles 60 are selectively engaged within corresponding recess 62 wherein a spline type engagement permits total removal of the cover element as required. A vertical support 63 (FIG. 3) mounts first and second cog members 64 and 65(FIG. 5) entraining a cog belt 66 carrying a plurality of cams 67 which selectively operate corresponding switches 68.

The linkage means 13 includes a motor enclosure 70 which also contains rechargeable batteries (not shown). An output shaft 72 mounts a flexible coupling 73 transmitting motion to a connecting shaft 74 which mounts the first cog member 65.

Operation

Commencing with the cover element in closed condition, operation of the device is commenced by closing a main switch (not shown) which powers the sensing means which continuously adjusts to the level of the ambient temperature to enable sensing of the presence of a user opposite the device. Upon detection, the sensing means operates the above-mentioned relay, driving the motor in a first direction to result in pivoting the cover element through approximately ninety degrees to access the contents of the food tray. At the end of the path of rotational travel, one of the switches 68 is opened by a corresponding cam 67 to interrupt passage of current to the motor. This condition obtains until the user has served himself and moves away, at which time the sensing means detects his departure. The relay means then operates to send current in an opposite direction to the motor which results in the return of the cover element to closed condition. The limit of this pivotal movement is determined by the opening of a second switch 68 by a second cam 67. The cycle is repeated upon the detection of a second user. The same cycle may be used by service personnel when replacing a food tray. Power may be disconnected while the cover is in opened condition by a third switch which senses an attempt by a user to close the cover himself, at which point the user will sense sufficient resistance to discontinue his effort or a sensor (not shown) will reverse the current to the motor. Preferably, the cover element does not include a manually engageable handle as is present in prior art devices.

If desired, the sensing means may include a capacitive type delay which will maintain the cover in opened condition for a short period of time after the user departs, during which time a second user may be detected by the sensing means.

Since the cover element is normally arranged for rotational movement through approximately ninety or one hundred eighty degrees, a counter balance force is necessarily progressive, and is best performed by a coil spring 75 (FIG. 7) cooperating with a lever 76 carried by the driven pintle 60 and a curved link 77.

Figure 7:
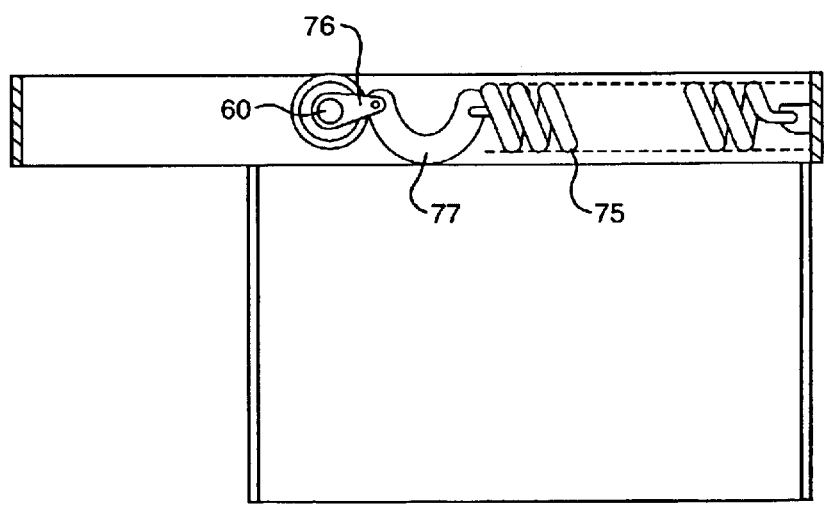
FIG. 7 is a sectional view showing a lid counterbalance means, as seen from the plane 7—7 in FIG. 2.
Figure 6:
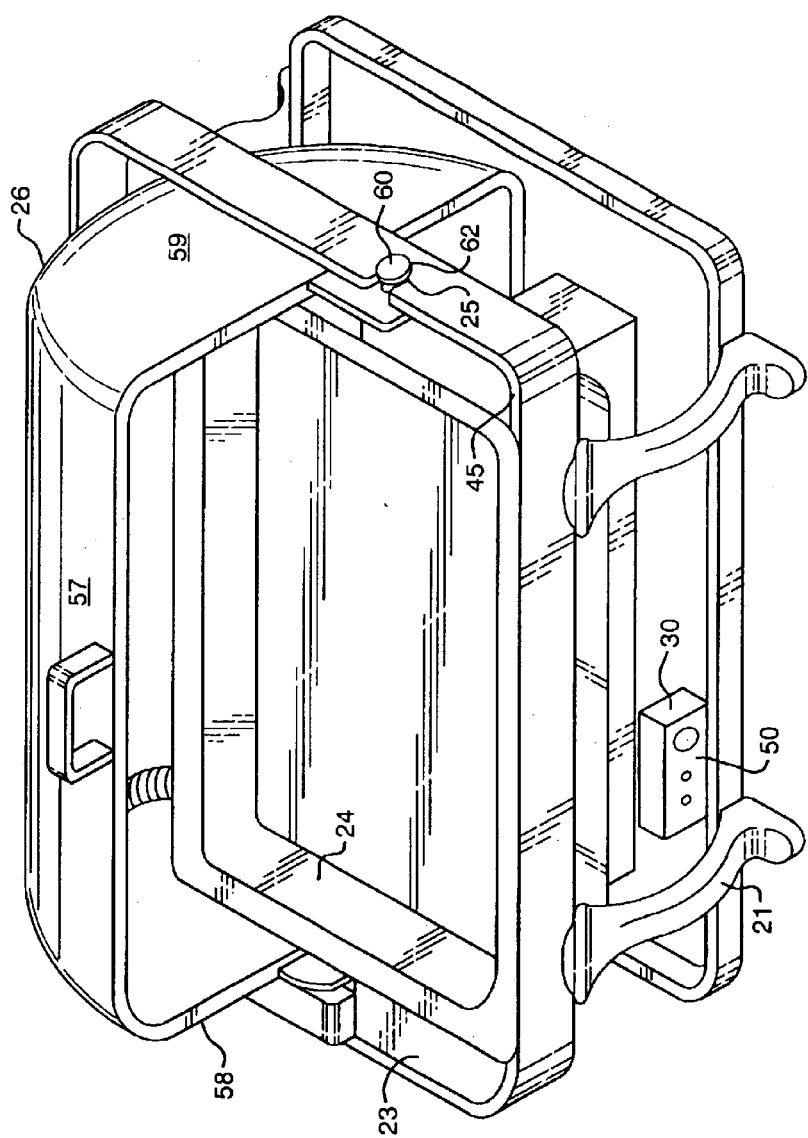
FIG. 6 is a perspective view showing a cover element in altered relative position.
Figure 8A:
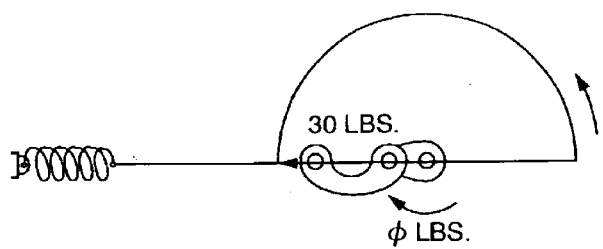
FIG. 8a through FIG. 8e are schematic views illustrating the progressive movement of a pivotally arranged chafing dish cover from completely closed to completely open relative condition, showing the vector resolution of the spring forces developed.
Figure 8B:
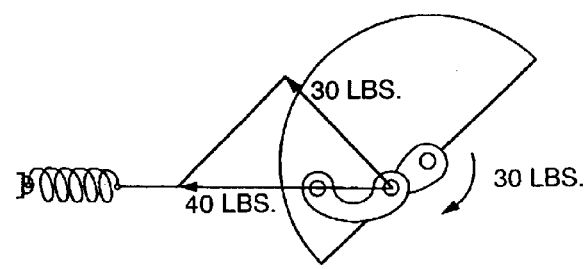
Figure 8C:
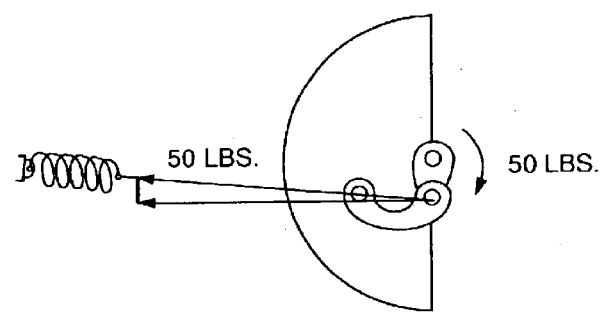
Figure 8D:
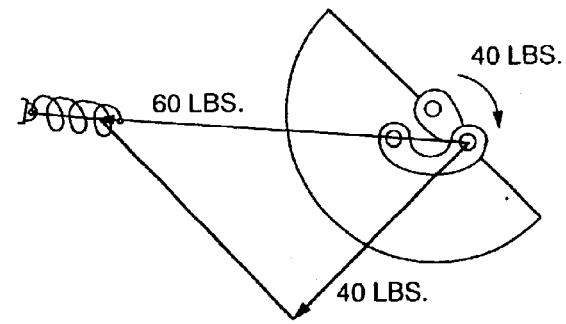
Figure 8E:
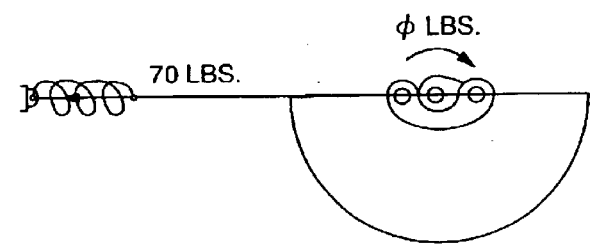
Figure 9A:
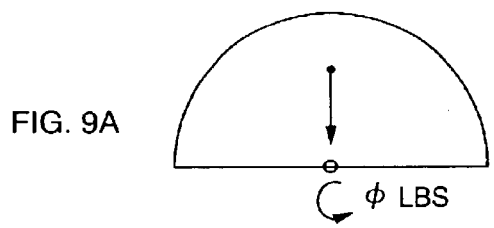
FIG. 9a through FIG. 9e are schematic views showing the corresponding effective torque applied to the center of gravity of the cover as it rotates from completely closed to completely open condition.
Figure 9B:
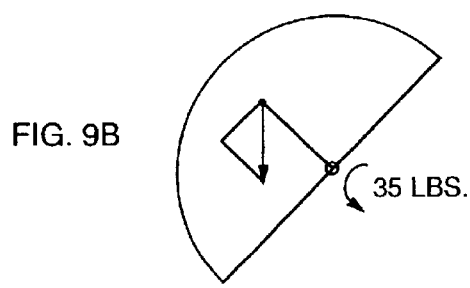
Figure 9C:
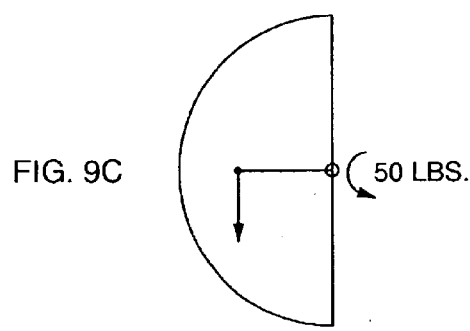
Figure 9D:
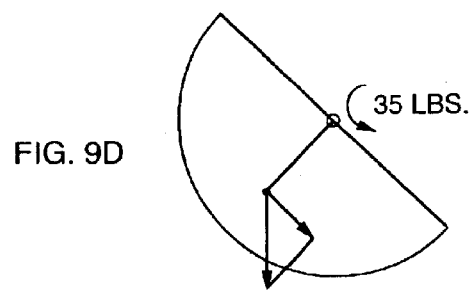
Figure 9E:
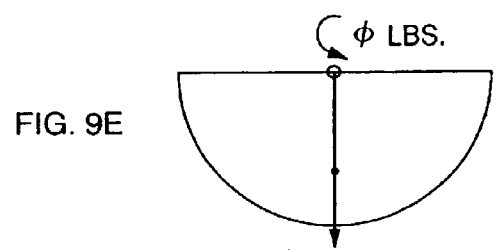

As will be understood from a consideration of FIGS. 7 to 9, when the pintle 60 is rotated, the lever 76 will guide the curved link 77 around the axis of the pintle as the cover is rotated through 180 degrees. When the cover is closed, no counter balancing force is applied to the pintle. As the pintle rotates, the spring is progressively tensed to reach a maximum when the cover has been opened to ninety degrees. Further rotational movement of the cover will continue to additionally stress the spring, but a smaller proportion of that force will effect a torque upon the lever 76, and when the cover has reached a full 180 degree rotation, the torque on the lever 76 will be effectively canceled, thus permitting the counter balance force to be substantially proportional to that required for a counter balancing action on the cover.

It is also possible to place the counter balance means partially outwardly of the end of one of the pintles, if desired, in which case, the curved link of the disclosed embodiment may be rectilinear, so that when the cover is in fully opened condition, the axis of the link will pass perpendicularly to the axis of the pintle.

Referring to FIGS. 8 and 9 in the drawing, the need for the disclosed counterbalancing means will be appreciated. Because of the semi-cylindrical configuration of the cover element, the center of gravity of the same is not at the axis of rotation which lies in the plane of the peripheral edge thereof. The weight to be counterbalanced ranges to a maximum where the cover reaches the half open or ninety degree rotational position. Further rotation shifts the center of gravity closer to the vertical plane containing the axis of rotation, and simultaneously, the effective torque is correspondingly reduced notwithstanding the continuous increase in tension of the spring.

Figure 10:
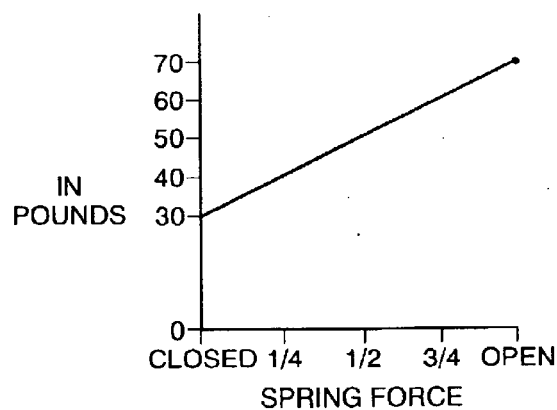
FIG. 10 is a graph illustrating the increasing tensional force developed by the linear acting spring shown in FIG. 7 as the cover element of the device is rotated from closed to open condition.
Figure 11:
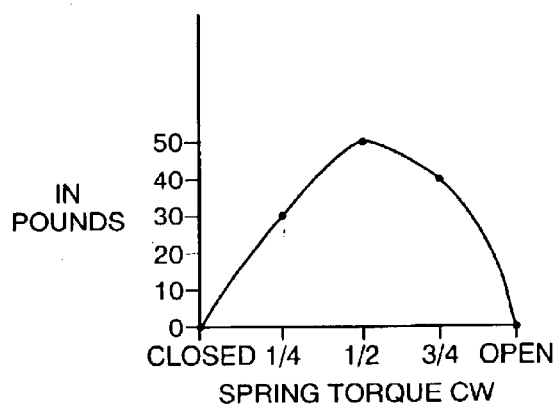
FIG. 11 is a graph illustrating the corresponding developed spring torque applied to the cover element.
Figure 12:
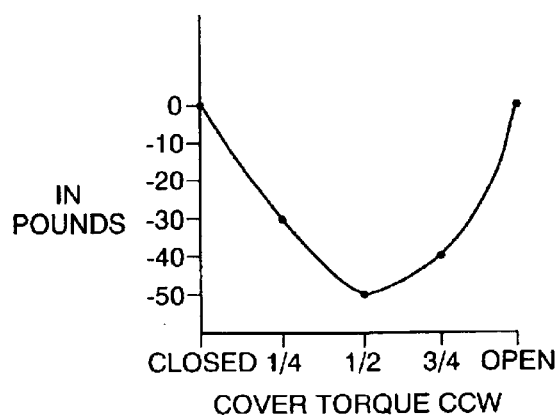
FIG. 12 is a graph illustrating the substantially balanced counter-torque developed by the cover element caused by the weight of the cover element, as well as static and dynamic frictional forces.

FIGS. 10, 11, and 12 compares the increased spring force with the corresponding generated torque axially applied to the pintle supporting the cover element. It substantially matches the counter torque developed by the cover as it rotates.

Figure 13:
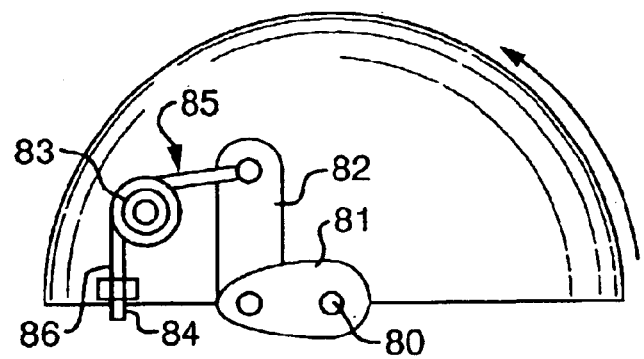
FIG. 13 is a schematic side elevational view showing an alternate form of counterbalance means.

FIG. 13 illustrates an alternate form of construction suitable for use with a relatively smaller covered dish which may be of non-rectangular configuration, such as a butter dish or the like.

In this version, one of the pintles 80 mounts a first rectilinear link 81 which pivotally interconnects with a second rectilinear link 82. A torsion spring 83 includes a fixed end 84 on a supporting frame (not shown). A first arm 85 interconnects to the link 82, and a second arm 86 is anchored to the frame supporting the replaceable dish or tray. The operation of this version is substantially similar to that of the principal form.

I wish it to be understood that I do not consider the invention to be limited to the precise details of structure shown and described in the specification, for obvious modifications will occur to those skilled in the art to which the invention pertains.

I claim:

1. In a chafing dish including a supporting frame and a cover element mounted for rotation about an axis passing through the body of said cover, improved means for progressively counter-balancing said cover comprising: a pair of pintles supporting said cover for movement about said axis, a lever extending laterally from at least one of said pintles, and fixed thereto at a first end thereof, a link having first and second ends, a first end being pivotally connected to said lever at a second end of said lever, a spring having first and second ends, said first end being connected to said second end of said link, said second end of said spring being connected to a peripheral location on said frame; whereby movement of said cover element from closed to open position results in progressive tensioning of said spring to provide a variable counter-balancing force to said lever as said link progressively approaches said pintle; said link surrounding said pintle after 180 degree rotation to cancel the counter balancing force of said spring.

2. Improved means in accordance with claim 1, said spring being of a longitudinally tensioning type.

\* \* \* \* \*